(12) United States Patent
Keast

(10) Patent No.: US 6,659,127 B2
(45) Date of Patent: Dec. 9, 2003

(54) RELIEF VALVE

(76) Inventor: Larry G. Keast, 9314 Livernois, Houston, TX (US) 77080

(*) Notice: Subject to any disclaimer, the term of this patent is extended or adjusted under 35 U.S.C. 154(b) by 141 days.

(21) Appl. No.: 09/880,991

(22) Filed: Jun. 13, 2001

(65) Prior Publication Data

US 2002/0189689 A1 Dec. 19, 2002

(51) Int. Cl.$^7$ ............................................. F16K 17/04
(52) U.S. Cl. ................................. 137/516.29; 175/195
(58) Field of Search ..................... 137/516.27, 516.29; 175/195

(56) References Cited

U.S. PATENT DOCUMENTS

| | | | | |
|---|---|---|---|---|
| 1,572,507 A | * | 2/1926 | Robert | 137/516.27 |
| 2,431,769 A | * | 12/1947 | Parker | 137/516.27 |
| 2,912,001 A | * | 11/1959 | Green | 137/516.29 |
| 2,931,385 A | * | 4/1960 | Carlisle et al. | 137/516.29 |
| 3,054,422 A | * | 9/1962 | Napolitano | 137/516.27 |
| 3,131,718 A | * | 5/1964 | Mingrone | 137/516.29 |
| 4,172,470 A | * | 10/1979 | Walker | 137/516.29 |
| 4,282,896 A | * | 8/1981 | Makino | 137/516.29 |
| 4,493,338 A | * | 1/1985 | Petursson | 137/454.5 |

\* cited by examiner

*Primary Examiner*—John Rivell
(74) *Attorney, Agent, or Firm*—John R Casperson

(57) ABSTRACT

A dribble less pressure relief valve for power swivels includes a relief valve body, a valve seat insert for the body, a plunger valve element to seat against the insert, and a biasing means to urge the plunger against the valve seat. The valve is designed to hold pressure drop-tight, and if opened, to reclose drop-tight.

4 Claims, 3 Drawing Sheets

RELIEF VALVE

BACKGROUND OF THE INVENTION

This invention relates to a relief valve which is especially useful to protect a power swivel as is used in oil and gas drilling operations.

With conventional power swivels, the hydraulic motor shaft seal can be blown out, due to accident or inexperience, in the event that the case drain hose becomes blocked or is disconnected or never attached. In the latter two cases, the drain is effectively blocked by the closed check valve in the hose quick-disconnect. A field shutdown results, and major labor is required to replace this inexpensive seal.

In many cases, hydraulic motor lip-type shaft seals used on power swivels have a much lower pressure rating than mechanical-type seals used in typical hydraulic pumps on these machines. In this case, if the pump fails before the motor, high case pressure fluid is sent through the common drain line to a perfectly good motor, thereby blowing a motor shaft seal. Major downtime results, due to the need to replace the seal, and further downtime and confusion can result due to difficulty in diagnosing the source of the problem, which is the pump, rather than the leaking motor.

A mechanism to protect the shaft seals of the motor and to alert personnel that a problem has occurred would be very desirable.

It is an object of this invention to provide a relief valve for a power swivel, to protect the seals.

It is a further object of this invention to provide a means to alert rig personnel that a problem has occurred with operation of the power swivel, which may endanger the seals.

SUMMARY OF THE INVENTION

According to one embodiment of the invention, a relief valve is installed to prevent pressure from rising high enough to blow the seal. When the relief valve relieves pressure, the hydraulic oil flow is directed perhaps 100 feet onto the rig floor below, to alert the rig personnel that something is wrong. This requirement also prevents the requirement for an additional long hose down to the power unit. The relief valve comprises a relief valve body, a valve seat insert for the body, a plunger valve element to seat against the insert, and a biasing means to urge the plunger against the valve seat.

The relief valve body has a first end and a second end and a generally longitudinally-extending passage extending into the valve body from the first end. The passage has an opening at the first end of the valve body and a bottom end which is spaced apart from the opening.

The valve seat insert is positioned in the generally longitudinally-extending passage of the relief valve body. The valve seat insert has a generally truncated cone-shaped valve seat surface which faces the bottom end of the generally longitudinally-extending passage in the relief valve body. The valve seat insert has a generally longitudinally-extending passage extending axially therethrough.

The plunger valve element has a first end and a second end and defines a generally truncated cone-shaped valve face positioned between the first end and the second end. The generally truncated cone-shaped valve face faces the first end of the valve element and forms a peripheral seal between an inside periphery of the valve seat surface and an outside periphery of the valve face when the relief valve is in a closed position.

A chamber is formed between the peripheral seal and the bottom end of the generally longitudinally extending passage. The relief valve body further defines at least one relief port which establishes a flow path between the chamber and an outside surface of the relief valve body to permit fluid flow through the longitudinally-extending passage of the valve seat insert and then through the at least one relief port when the relief valve is in an open position.

A biasing means is positioned in the chamber to bias the valve face against the valve seat surface and hold the relief valve in a normally closed position.

In a preferred embodiment, the valve is designed to hold pressure drop-tight, and if opened, to reclose drop-tight, unlike ordinary commercially available valves which were tried first. It is common knowledge in the hydraulics industry that such valves "dribble" constantly before opening at their relief setting, which is unacceptable in this application. Zero leakage can be tolerated dripping down onto the workers in normal operation, and the major "alarm" flow may never actually occur. The preferred inventive valve acts simply as an insurance policy. It prevents expensive downtime resulting from an inadvertent simple error, and downtime of the swivel and confusing troubleshooting when the pump is actually at fault.

DETAILED DESCRIPTION OF THE INVENTION

Figure 1:
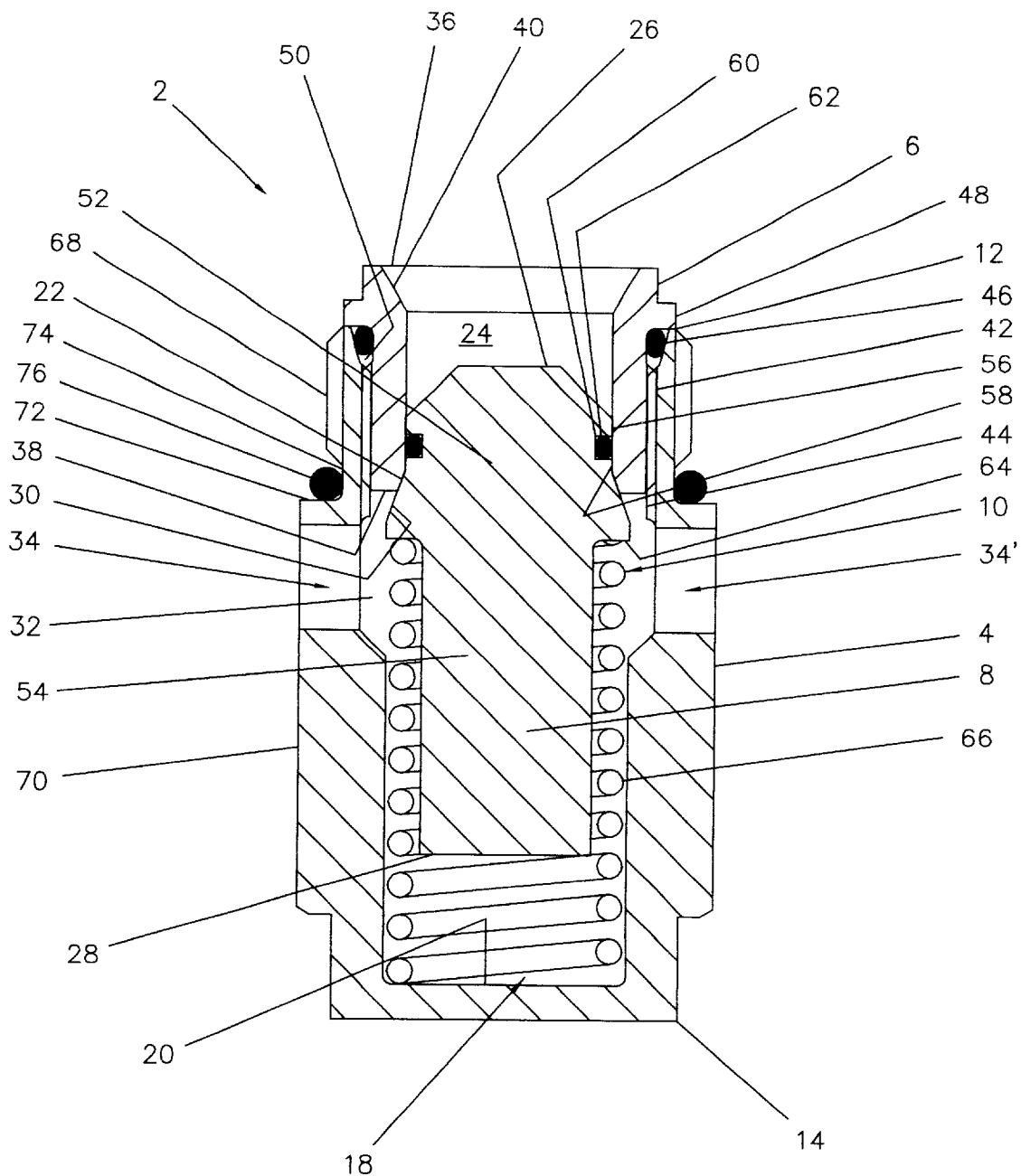
FIG. 1 is a cross-sectional view of a relief valve according to an embodiment of the invention.
Figure 2:
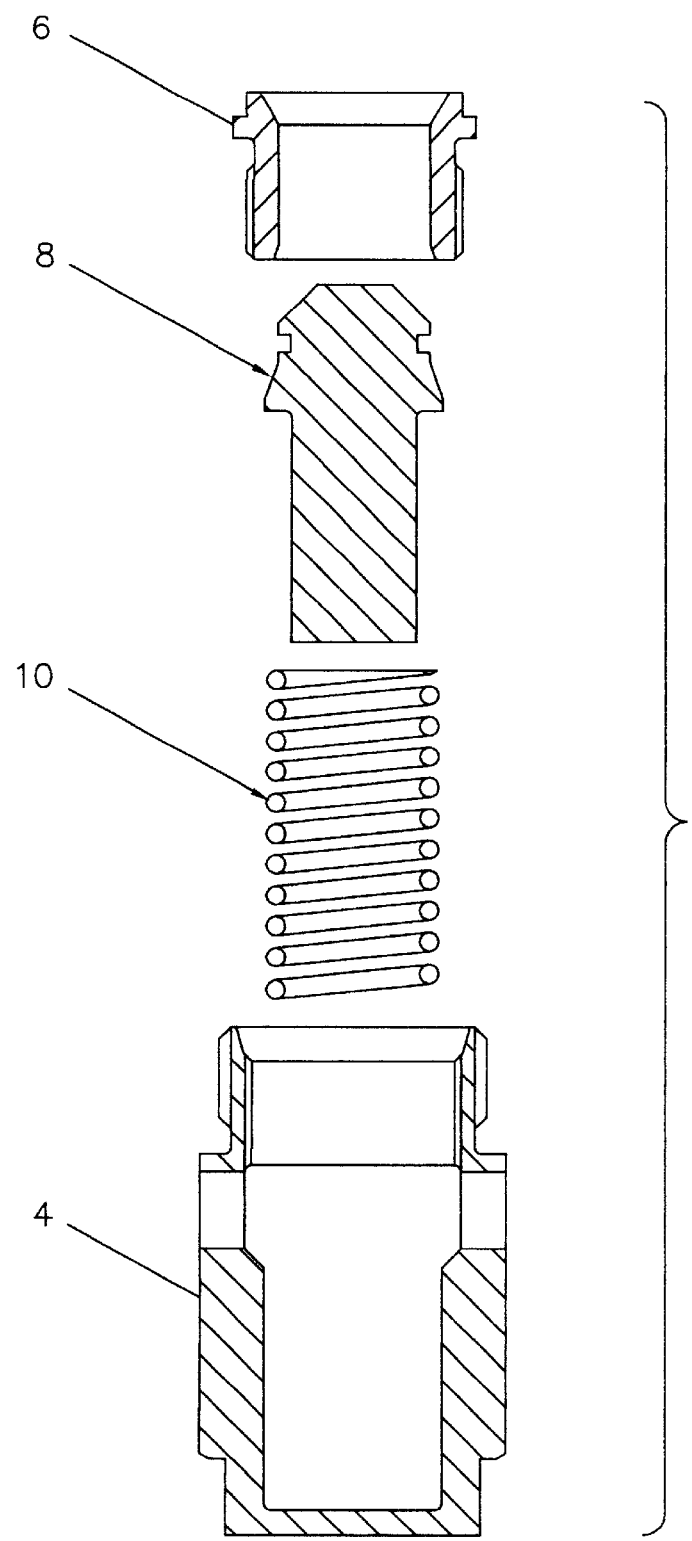
FIG. 2 is an exploded view illustrating the major components of the relief valve shown in FIG. 1.
Figure 3:
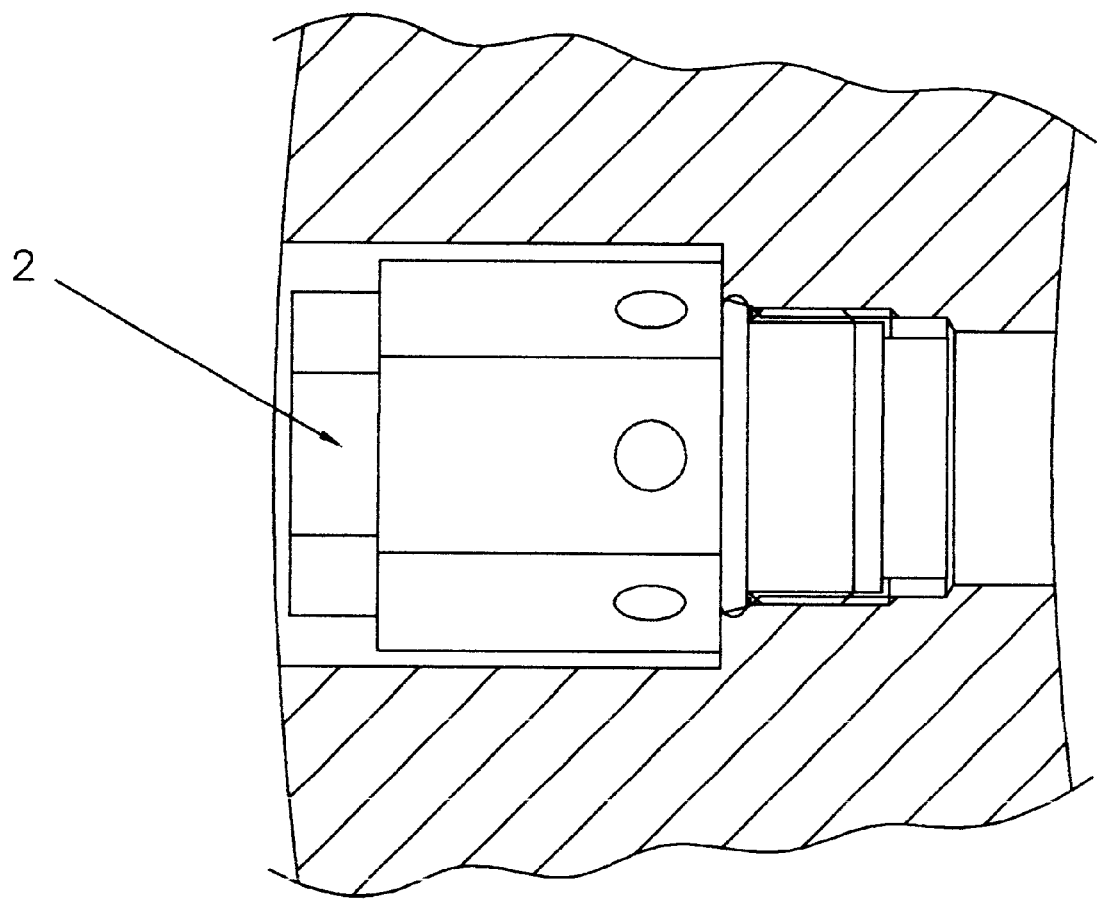
FIG. 3 is a pictorial illustration, partly in cross section, showing a relief valve as in FIG. 1 positioned in a portion of a power swivel housing.

The relief valve 2 comprises a relief valve body 4, a valve seat insert 6 for the body, a plunger valve element 8 to seat against the insert, and a biasing means 10 to urge the plunger against the valve seat.

The relief valve body has a first end 12 and a second end 14 and a generally longitudinally-extending passage 18 extending into the valve body from the first end. The passage has an opening at the first end of the valve body and a bottom end 20 which is spaced apart from the opening.

The valve seat insert is positioned in the generally longitudinally-extending passage and has a generally truncated cone-shaped valve seat surface 22 which faces the bottom end of the generally longitudinally-extending passage. The valve seat insert has a generally longitudinally-extending passage 24 extending axially therethrough.

The plunger valve element has a first end 26 and a second end 28 and defines a generally truncated cone-shaped valve face 30 positioned between the first end and the second end. The generally truncated cone-shaped valve face faces the first end of the valve element and forms a peripheral seal between an inside periphery of the valve seat surface and an outside periphery of the valve face when the relief valve is in a closed position.

A chamber 32 is formed between the peripheral seal and the bottom end of the generally longitudinally extending passage. The relief valve body further defines at least one relief port 34 which establishes a flow path between the chamber and an outside surface of the relief valve body to permit fluid flow through the longitudinally-extending passage of the valve seat insert and then through the at least one relief port when the relief valve is in an open position.

The biasing means 10 is positioned in the chamber to bias the valve face against the valve seat surface.

The valve seat insert has a first end 36 and a second end 38 and the generally longitudinally-extending passage extends from the first end to the second end. The generally longitudinally-extending passage preferably flares radially outwardly at the second end to form the generally truncated cone-shaped valve seat surface. In the illustrated embodiment, a flared inside surface 40 is positioned at the upper end of the passage The valve seat insert preferably has a generally cylindrical threaded exterior surface 42 extending from the second end toward the first end, and the generally longitudinally-extending passage extending into the relief valve body has a generally cylindrical threaded inside surface 44 extending into the valve body from near the first end. The generally cylindrical threaded exterior surface of the valve seat insert is then threadably engaged with the generally cylindrical threaded inside surface of the relief valve body.

A first O-ring seal 46 is preferably positioned between a portion of the valve seat insert and a portion of the relief valve body. Preferably, the generally cylindrical threaded exterior surface of the valve seat insert has a lower end corresponding to the second end of the valve seat insert and an upper end, and the valve seat insert further defines a peripheral flange element 48 positioned near the upper end of the generally cylindrical threaded exterior surface. The relief valve body preferably defines an annular O-ring receiving recess 50 between the generally cylindrical threaded inside surface and the first end of the relief valve body. The first O-ring seal is positioned in the annular O-ring receiving recess and is urged by the annular flange into sealing engagement with both the relief valve body and the valve seat insert.

The plunger valve element preferably has a head piece 52 and a tail piece 54. The truncated cone-shaped valve face is preferably peripherally formed on a lower portion of the valve head piece. A middle portion 56 of the valve head piece is preferably generally cylindrically shaped and is closely slidably received by a generally cylindrical inside surface 58 of the valve seat insert.

In a preferred embodiment, the middle portion of the valve head piece defines an annular O-ring receiving groove 60. A second O-ring seal 62 is positioned in the O-ring receiving groove of the valve head piece and sealingly engages the generally cylindrical middle portion of the valve head piece and the generally cylindrical inside surface of the valve seat insert. As pressure builds up in the case and exceeds the force exerted by the biasing means, the plunger valve element will begin to move downwardly. The second O-ring seal will remain sealingly engaged with the generally cylindrical middle portion of the valve head piece until it is positioned alongside the truncated cone-shaped valve seat surface of the insert. At that point, hydraulic fluid will be permitted to flow through the relief valve. The arrangement shown thus will not dribble until its predetermined opening pressure rating has been exceeded, and when the pressure has been reduced to below its opening pressure rating, it will again close dribble tight.

In the illustrated embodiment, the plunger valve head piece has a larger diameter than the plunger valve tail piece and an annular flange 64 is defined between a side surface of the plunger valve tail piece and a side surface of the plunger valve head piece. The biasing means preferably comprises a coil spring 66 having a first end and a second end positioned around the plunger valve tail piece with the first end urging against the annular flange and the second end urging against the bottom end of the longitudinally-extending passage through the relief valve body. The strength of the coil spring is easily selected to provide the desired relief pressure rating of the relief valve. If desired, the spring could be provided with a mechanism so that its force could be adjusted, or it could be replaced by a pneumatic or hydraulic biasing mechanism.

The relief valve body has an outer surface preferably defining an upper end portion 68 and a lower end portion 70. The upper end portion defines an exterior threaded surface. The lower end portion is of a larger diameter than the upper end portion. An annular flange 72 is defined between the upper end portion and the lower end portion. A recess 74 for receipt of an O-ring seal is defined on the upper end portion adjacent to the annular flange. A third O-ring seal 76 is positioned in the recess.

In the illustrated embodiment, the at least one relief port comprises diametrically opposed first and second relief ports 34, 34' opening between the chamber and an outside surface of the relief valve body through the lower end portion of the relief valve body at a position near the annular flange defined between the upper end portion and the lower end portion.

The relief valve just described is well suited for use in a method for providing rig personnel with a visible alarm signal that hydraulic fluid in an overhead power swivel has exceeded a predetermined pressure limit. The method is carried out by providing the power swivel with a relief valve that opens to visibly vent hydraulic fluid when the predetermined pressure limit has been exceeded without preliminarily dribbling as the pressure limit is approached. The alarm method comprises opening the pressure relief valve so as to visibly vent hydraulic fluid when the predetermined pressure is exceeded, thereby providing the rig personnel with the visible alarm signal.

The relief valve can also be used in a manner which does not result in the open air venting of the hydraulic fluid onto the rig personnel. For example, the relief valve could be used in conjunction with a long hose which extends from the power swivel to an exhaust at a lower point on the rig, such as the power unit. The relief valve could be positioned anywhere along the hose, but generally would be located near the top or bottom. A sensing means for generating an alarm such as an audible alarm could be employed to signal rig personnel that the relief valve has relieved.

While certain preferred embodiments of the invention have been described herein, the invention is not to be construed as being so limited, except to the extent that such limitations are found in the claims.

What is claimed is:

1. A relief valve comprising
   a relief valve body having a first end and a second end and a generally longitudinally-extending passage extending into said valve body from the first end, said generally longitudinally-extending passage having an opening at the first end of the valve body and a bottom end spaced apart from the opening;
   a valve seat insert positioned in said generally longitudinally-extending passage and having a generally truncated cone-shaped valve seat surface which faces the bottom end of the generally longitudinally-extending passage, said valve seat insert having a generally longitudinally-extending passage extending axially therethrough;

a plunger valve element having a first end and a second end and defining a generally truncated cone-shaped valve face positioned between the first end and the second end, said generally truncated cone-shaped valve face facing the first end of the valve element and forming a peripheral seal between an inside periphery of the valve seat surface and an outside periphery of the valve face when the relief valve is in a closed position;

wherein a chamber is formed between the peripheral seal and the bottom end of the generally longitudinally extending passage; and biasing means positioned in the chamber to bias the valve face against the valve seat surface;

wherein said relief valve body further defines at least one relief port which establishes a flow path between the chamber and an outside surface of the relief valve body to permit fluid flow through the longitudinally-extending passage of the valve seat insert and then through the at least one relief port when the relief valve is in an open position, wherein the plunger valve element has a head piece and a tail piece, and the truncated cone-shaped valve face is peripherally formed on a lower portion of the valve head piece, a middle portion of the valve head piece being generally cylindrically shaped and being closely slidably received by a generally cylindrical inside surface of the valve seat insert, wherein the middle portion of the valve head piece defines an annular O-ring receiving groove, said relief valve further comprising a first O-ring seal positioned in the O-ring receiving groove of the valve head piece sealingly engaging the generally cylindrical middle portion of the valve head piece and the generally cylindrical inside surface of the valve seat insert, wherein the valve seat insert has a first end and a second end and the generally longitudinally-extending passage extends from the first end to the second end, said generally longitudinally-extending passage flaring radially outwardly at the second end to form the generally truncated cone-shaped valve seat surface, wherein the valve seat insert has a generally cylindrical threaded exterior surface extending from the second end toward the first end, and the generally longitudinally-extending passage extending into the relief valve body has a generally cylindrical threaded inside surface extending into the valve body from near the first end, the generally cylindrical threaded exterior surface of the valve seat insert being threadably engaged with the generally cylindrical threaded inside surface of the relief valve body, said relief valve further comprising a second O-ring seal positioned between a portion of the valve seat insert and a portion of the relief valve body, wherein the generally cylindrical threaded exterior surface of the valve seat insert has a lower end corresponding to the second end of the valve seat insert and an upper end, and the valve seat insert further defines a peripheral flange element positioned near the upper end of the generally cylindrical threaded exterior surface, wherein the relief valve body defines an annular O-ring receiving recess between the generally cylindrical threaded inside surface and the first end of the relief valve body, wherein the second O-ring seal is positioned in the annular O-ring receiving recess and is urged by the annular flange into sealing engagement with both the relief valve body and the valve seat insert, wherein the plunger valve head piece has a larger diameter than the plunger valve tail piece and an annular flange is defined between a side surface of the plunger valve tail piece and a side surface of the plunger valve head piece, wherein the biasing means comprises a coil spring having a first end and a second end positioned around the plunger valve tail piece with the first end urging against the annular flange and the second end urging against the bottom end of the longitudinally-extending passage through the relief valve body, wherein the relief valve body has an outer surface defining an upper end portion and a lower end portion, wherein the upper end portion defines an exterior threaded surface, wherein the lower end portion is of a larger diameter than the upper end portion, wherein an annular flange is defined between the upper end portion and the lower end portion, wherein a recess for receipt of an O-ring seal is defined on the upper end portion adjacent to the annular flange, said relief valve further defining a third O-ring seal positioned in said recess.

2. A relief valve as in claim 1 wherein the at least one relief port comprises diametrically opposed first and second relief ports opening between the chamber and an outside surface of the relief valve body through the lower end portion of the relief valve body at a position near the annular flange defined between the upper end portion and the lower end portion.

3. A method for providing personnel on a rig with a visible alarm signal that hydraulic fluid in an overhead power swivel has exceeded a predetermined pressure limit, said method comprising providing the power swivel with a relief valve as set forth in claim 1 that opens to visibly vent hydraulic fluid when the predetermined pressure limit has been exceeded without preliminarily dribbling as the pressure limit is approached.

4. A method as in claim 3 further comprising opening the pressure relief valve when the predetermined pressure limit is exceeded, thereby venting hydraulic fluid to provide a visual alarm signal for the rig personnel.

* * * * *